United States Patent [19]
Abe et al.

[11] Patent Number: 5,774,180
[45] Date of Patent: Jun. 30, 1998

[54] IMAGE SENSOR CAPABLE OF PRODUCING AN IMAGE SIGNAL FREE FROM AN AFTERIMAGE

[75] Inventors: Tsutomu Abe; Hiroyuki Miyake, both of Kanagawa, Japan

[73] Assignee: Fuji Xerox Co., Ltd., Tokyo, Japan

[21] Appl. No.: 623,055

[22] Filed: Mar. 28, 1996

Related U.S. Application Data

[63] Continuation of Ser. No. 160,798, Dec. 3, 1993, abandoned.

[30] Foreign Application Priority Data

Dec. 4, 1992 [JP] Japan .................................... 4-350252

[51] Int. Cl.[6] .................................................. H04N 5/335
[52] U.S. Cl. .......................................... 348/241; 348/294
[58] Field of Search ...................................... 348/207, 241, 348/243, 244, 248, 249, 250, 251, 234, 311, 312, 313, 314, 302, 308, 294; 257/214, 215, 222, 223, 225; 250/208.1, 294; H04N 5/335

[56] References Cited

U.S. PATENT DOCUMENTS

| | | | |
|---|---|---|---|
| 4,565,928 | 1/1986 | Yamamoto et al. | 250/578 |
| 4,584,607 | 4/1986 | Miyazawa | 358/482 |
| 4,686,554 | 8/1987 | Ohmi et al. | 257/225 |
| 4,714,836 | 12/1987 | Kitamura et al. | 250/578 |
| 4,957,659 | 9/1990 | Arques | 348/308 |
| 5,093,727 | 3/1992 | Kakinuma et al. | 348/313 |
| 5,105,277 | 4/1992 | Hayes et al. | 348/313 |
| 5,136,389 | 8/1992 | Suzuki et al. | 348/313 |
| 5,202,575 | 4/1993 | Sakai | 257/292 |
| 5,331,145 | 7/1994 | Weckler et al. | 250/208.1 |

FOREIGN PATENT DOCUMENTS

| | | | |
|---|---|---|---|
| 2-265306 | 10/1990 | Japan | H04N 5/335 |
| 2-265362 | 10/1990 | Japan . | |

*Primary Examiner*—Andrew Faile
*Assistant Examiner*—Tuan V. Ho
*Attorney, Agent, or Firm*—Finnegan, Henderson, Farabow, Garrett & Dunner, L.L.P.

[57] ABSTRACT

Charges photoelectrically generated in reversely biased photodiodes are sequentially transferred through respective thin-film transistors to a driver IC. A plurality of capacitors are connected to the anodes of the respective photodiodes. During a charge reading period, a variable voltage generation circuit supplies the cathode of each photodiode with a first voltage that is higher than an anode voltage to reversely bias the photodiode. During a predetermined period after the charge reading period, the variable voltage generation circuit supplies the cathode of the photodiode with a second voltage that is lower than the first voltage and a gate pulse generation circuit supplies, through the associated capacitor, the anode of the photodiode with a third voltage that allows the photodiode to be forwardly biased.

6 Claims, 3 Drawing Sheets

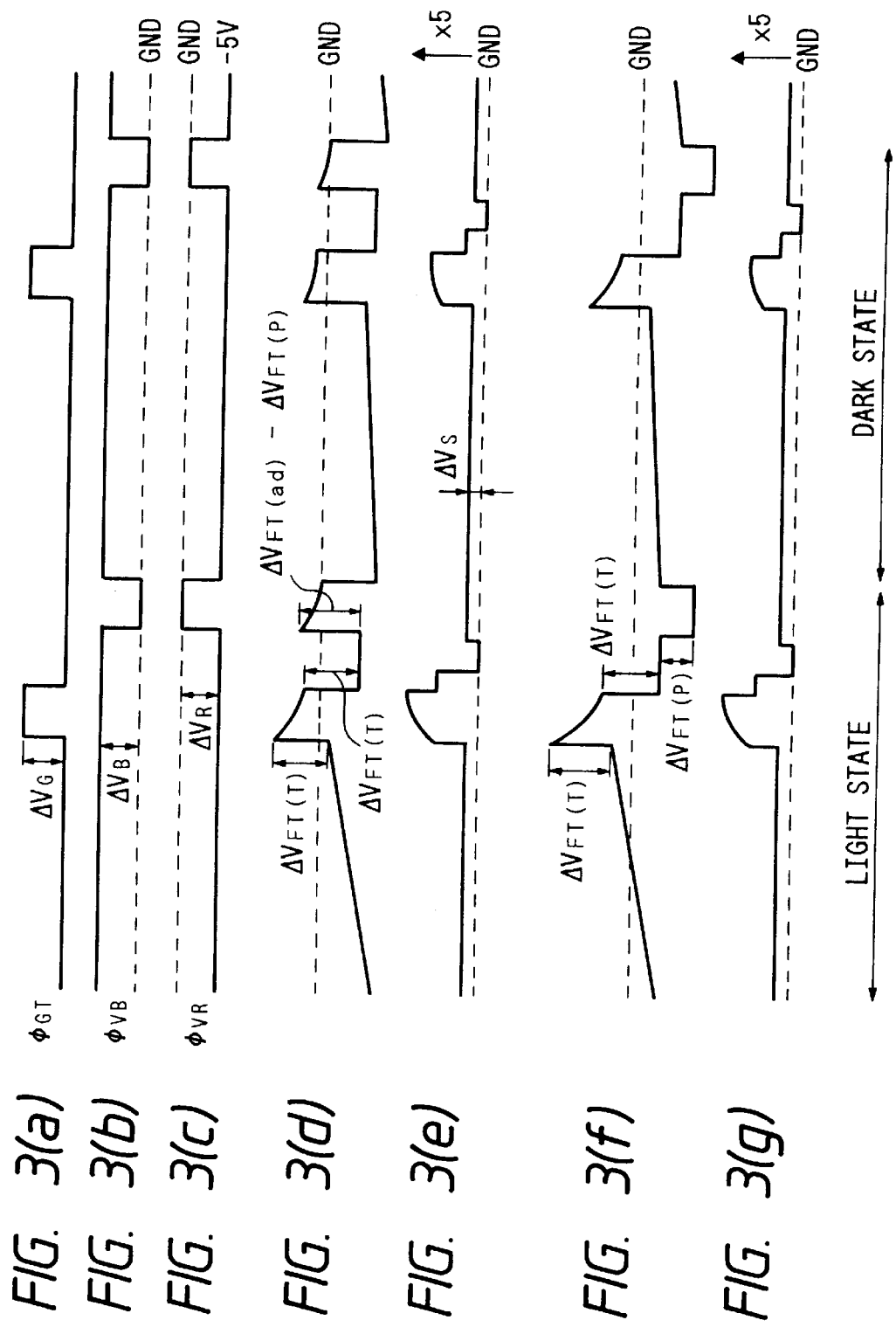

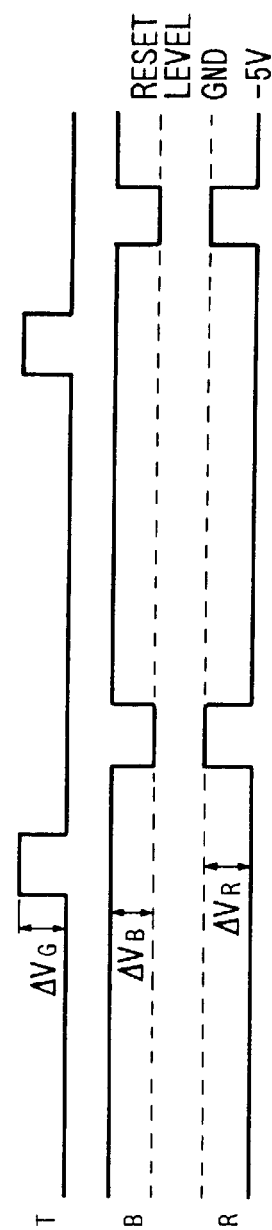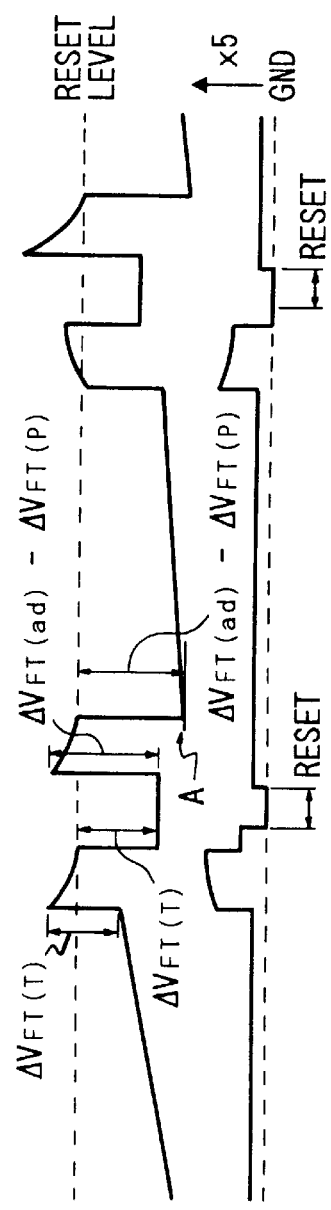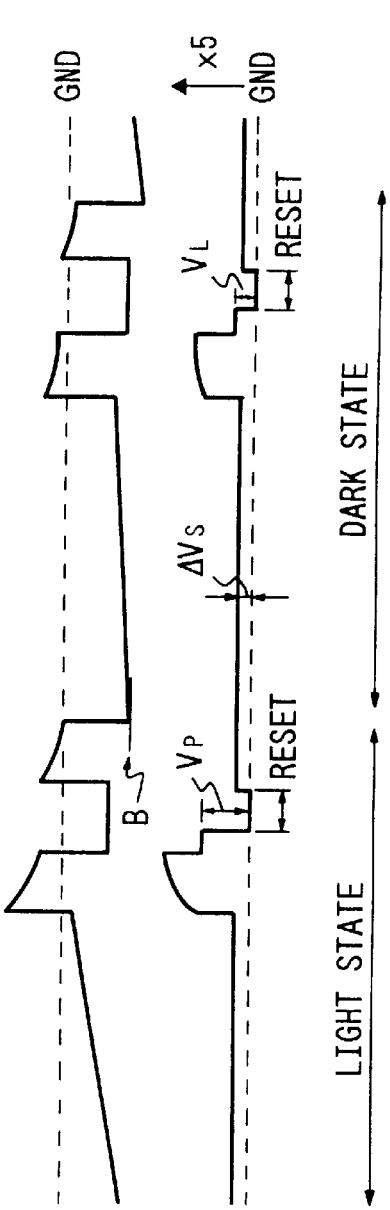

IMAGE SENSOR CAPABLE OF PRODUCING AN IMAGE SIGNAL FREE FROM AN AFTERIMAGE This application is a continuation of application Ser. No. 08/160,798, filed Dec. 3, 1993, now abandoned.

BACKGROUND OF THE INVENTION

The present invention relates to an image sensor used in an image scanner, a facsimile machine, etc. to perform image reading.

As an example of a conventional image sensor of the above type, a TFT-drive-type image sensor is disclosed in Japanese Patent Application Unexamined Publication No. 2-265362. In this image sensor, a number of photodiodes are arranged in line and grouped into a plurality of blocks, and thin-film transistors (hereinafter abbreviated as "TFTs") are connected in series to the respective photodiodes. Charges generated in the respective photodiodes are transferred, on a block-by-block basis, to wiring capacitances via the respective TFTs temporarily and stored therein. The stored charges are read out in time sequence at a rate of several hundreds of kilohertz to several hundreds of megahertz to produce an electrical signal.

To produce a clear image signal having no what is called an afterimage by the above TFT-drive-type image sensor, it is desired that there exist no residual charges in the photodiodes after charges are read therefrom via the TFTs.

However, in actual image sensors, non-transferred charges remain in parasitic capacitances of the photodiodes and drain-gate overlap capacitances of the TFTs, and are added to charges generated in reading a new image, to cause what is called an afterimage phenomenon. As a result, the image reading operation cannot be performed correctly.

SUMMARY OF THE INVENTION

An object of the present invention is to provide an image sensor which can produce a correct image signal that is free from the afterimage phenomenon due to non-transferred charges, and to provide an image sensor-drive method which can eliminate the non-transferred charges in a simple manner.

According to the invention, an image sensor in which charges photoelectrically generated in a plurality of reversely biased photodiodes are read out to produce an image signal, comprises:

a plurality of capacitors connected to anodes of the respective photodiodes;

main bias means for supplying a cathode of each of the photodiodes with a first voltage that is higher than a voltage of an anode of the photodiode during a charge reading period of the photodiode, with a second voltage that is lower than the first voltage during a predetermined period after the charge reading period, and with the first voltage after a lapse of the predetermined period; and auxiliary bias means for supplying, through an associated one of the capacitors during the predetermined period, the anode of the photodiode with a third voltage that allows the photodiode to be forwardly biased.

Further, according to the invention, a drive method of an image sensor in which charges photoelectrically generated in a plurality of reversely biased photodiodes are read out to produce an image signal, comprises the steps of:

reading out charges from each of the photodiodes in a reversely biased state;

making the photodiode in a forwardly biased state during a predetermined period; and returning the photodiode into the reversely biased state.

BRIEF DESCRIPTION OF THE DRAWINGS

FIGS. 3(a)–3(g) are waveform diagrams showing the operation of the one-pixel portion of the image sensor of FIG. 1; and FIGS. 4(a)–4(g) are waveform diagrams showing another drive method according to a second embodiment of the invention.

DESCRIPTION OF THE PREFERRED EMBODIMENTS

Figure 1:
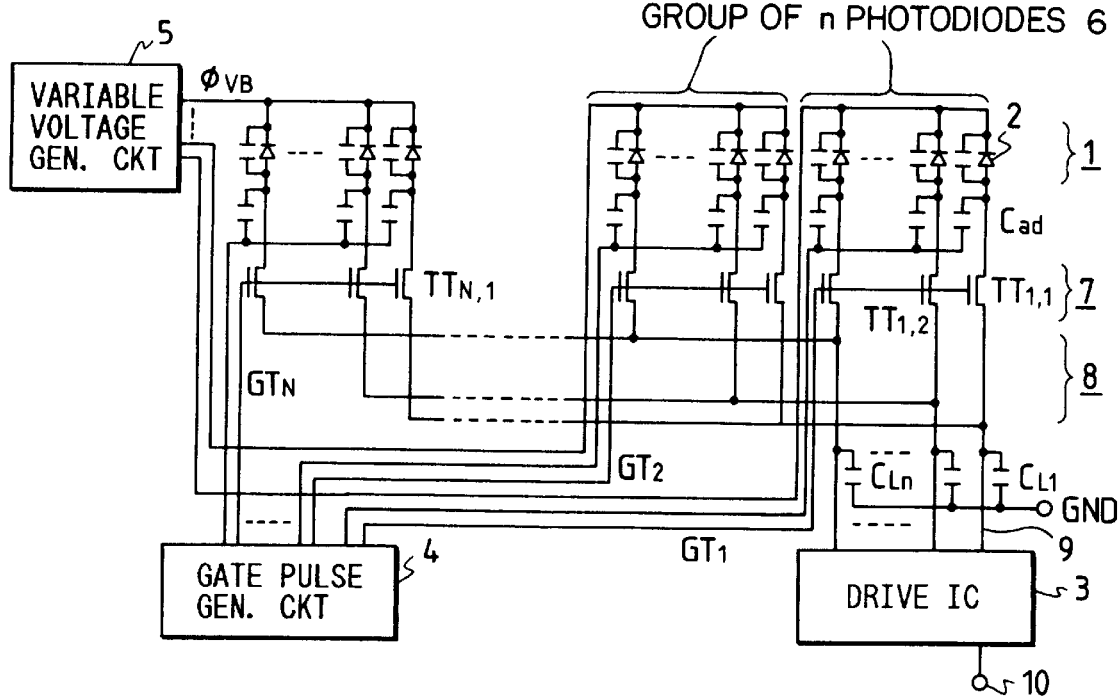
FIG. 1 is an equivalent circuit diagram of an image sensor according to an embodiment of the present invention.
Figure 2:
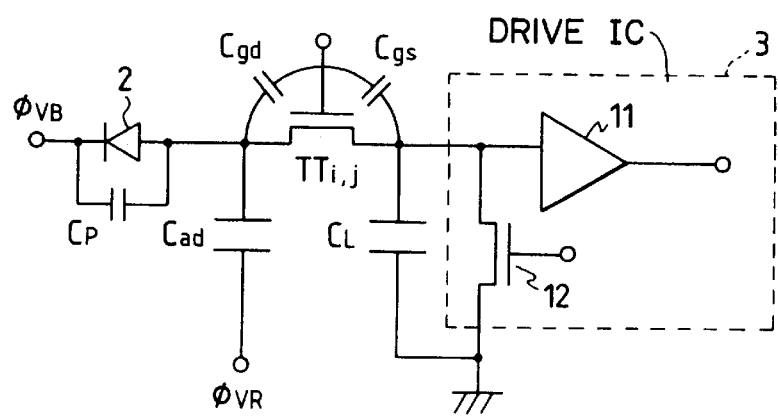
FIG. 2 is an equivalent circuit diagram of a one-pixel portion of the image sensor of FIG. 1.

Referring to FIGS. 1, 2 and 3(a)–3(g), we will describe an image sensor and an image sensor drive method according to an embodiment of the present invention. FIG. 1 is an equivalent circuit diagram of the entire image sensor of the embodiment, FIG. 2 is an equivalent circuit diagram of a one-pixel portion of the image sensor, and FIGS. 3(a)–3(g) are waveform diagrams showing signals at the main points of the image sensor.

As shown in FIG. 1, the image sensor mainly consists of a linear photodiode array 1 including a number of photodiodes 2 and having a length approximately equal to the width of a document (not shown) and including photodiodes 2, additional capacitors Cad provided for the respective photodiodes 2, thin-film transistors $TT_{i,j}$ (i=1 to N, j=1 to n) connected to the respective photodiodes 2, a driver IC 3, a gate pulse generation circuit 4, and a variable voltage generation circuit 5.

The photodiode array 1 consists of N blocks 6 of photodiodes 2, and each block 6 includes n photodiodes 2. The cathode of each photodiode 2 is connected to the variable voltage generation circuit 5 (main bias means), and the anode of each photodiode 2 is connected to the drain of the corresponding thin-film transistor $TT_{i,j}$. The sources of the thin-film transistors $TT_{i,j}$, which constitute a charge transfer section 7, are connected to multilayer wirings 8 in matrix form. The wirings 8 are connected to the driver IC 3 via common signal lines 9. The number of common signal lines 9 is n, which is equal to the number of photodiodes 2 belonging to one block. The source of one thin-film transistor $TT_{i,j}$ per block is connected to each common signal line 9 via the wirings 8. In total, the sources of the N thin-film transistors $TT_{i,j}$ are connected to each common signal line 9 via the wirings 8.

Being grouped for the respective blocks 6, the gates of the thin-film transistors $TT_{i,j}$ are connected to the gate pulse generation circuit 4 (auxiliary bias means). On the other hand, the cathodes of the photodiodes 2 are connected to the variable voltage generation circuit 5 on a block-by-block basis so as to receive voltages described later.

We will briefly describe the total operation of the image sensor having the above constitution. Gate pulses $\phi_{GT}$ are sequentially sent out from the gate pulse generation circuit 4 to gate lines $GT_i$ (i=1 to N), where the number N is equal to the number of blocks 6. For example, with respect to the photodiodes 2 of the first block to which the first gate pulse $\phi_{GT1}$ is supplied, the thin-film transistors $TT_{1,j}$ turn conductive and charges generated in the photodiodes 2 are transferred to and stored in the respective wiring capacitances $C_{Lj}$.

The charges stored in the wiring capacitances $C_{Lj}$ change the potentials of the respective common signal lines 9, and analog switches (the number of which is equal to the number of photodiodes 2 of one block) in the driver IC 3 are closed sequentially to supply the thus-changed potentials of the common signal lines 9 to an output terminal 10 in time sequence. Thereafter, a voltage $\phi_{VB}$ being applied from the variable generation circuit 5 to the cathodes of the photodiodes 2 and a voltage $\phi_{VR}$ being applied from the gate pulse generation circuit 4 to the electrodes of the additional capacitors Cad opposite to the electrodes that are connected to the anodes of the photodiodes 2 are respectively changed by predetermined amounts (described later in detail). As a result, the photodiodes 2 are forwardly biased to reset non-transferred charges remaining in parasitic capacitances Cp of the respective photodiodes 2, the additional capacitors Cad and gate-drain overlap capacitances Cgd of the respective thin-film transistors $TT_{i,j}$.

The above operation is performed for the respective blocks 6, so that an image signal of one line in the main scanning direction of a document is obtained. Further, the one-line operation is repeated while the document (not shown) is moved by a known document feeding means such as rollers, to thereby produce an image signal of the entire document.

Referring to FIG. 2, we will describe a one-pixel equivalent circuit of the image sensor having the above constitution.

As shown in FIG. 2, the photodiode 2 has the parasitic capacitance Cp. The gate-drain overlap capacitance of the thin-film transistor $TT_{i,j}$ is denoted by Cgd, and a capacitance formed between the gate and source of the thin-film transistor $TT_{i,j}$ is denoted by Cgs. The wiring capacitance $C_L$ is formed between the wirings 8 and common signal, line 9 and the ground.

The additional capacitor Cad is connected between the anode of the photodiode 2 and the gate pulse generation circuit 4. Unlike the above-described overlap capacitance Cgd etc., the additional capacitor Cad consists of two electrodes and a dielectric material interposed between those electrodes.

The source of the thin-film transistor $TT_{i,j}$ is connected to an amplifier 11 of the driver IC 3, and is also connected to the drain of a MOS transistor 12 for resetting charges of the wiring capacitance $C_L$. The source of the MOS transistor 12 is grounded, and its gate receives a pulse signal from a drive pulse generation portion (not shown) of the driver IC 3 at the time of resetting.

Referring to FIGS. 3(a)–3(g), we will describe the operation of the one-pixel portion. FIGS. 3(a)–3(c) show the gate pulses $\phi_{GT}$, the voltage $\phi_{VB}$ applied to the cathode, and the voltage $\phi_{VR}$ applied to the additional capacitor Cad, respectively. FIGS. 3(d) and 3(f) show the anode potential of the photodiode 2, and FIGS. 3(e) and 3(g) show the source potential of the thin-film transistor $TT_{i,j}$.

Charges generated in the photodiode 2 are read out in the following manner. Charges photoelectrically generated in the photodiode 2 in response to reflection light from a document (not shown) are first stored for a certain period in the parasitic capacitance Cp, additional capacitor Cad and overlap capacitance Cgd. As shown in FIG. 3(d), during the storage of photoelectrically generated charges, i.e., before input of the gate pulse $\phi_{GT}$, the drain potential increases relatively rapidly in a light state and increases gradually in a dark state.

After a lapse of the certain period, the gate pulse $\phi_{GT}$ is input to the thin-film transistor $TT_{i,j}$ to turn it conductive. As a result, the charges of the parasitic capacitance Cp etc. are transferred through the thin-film transistor $TT_{i,j}$ to the wiring capacitance $C_L$ and stored therein. Due to the charges stored in the wiring capacitance $C_L$, the source potential of the thin-film transistor $TT_{i,j}$ rises in contrast to the drain potential and the thin-film transistor $TT_{i,j}$ turns non-conductive. The source potential thus risen is amplified by the amplifier 11, and the amplified voltage is output from the output terminal 10 of the driver IC 3 as the image reading signal.

After the output of the image reading signal, a gate signal is input to the gate of the MOS transistor 12 from the non-illustrated circuit portion to turn it conductive, to thereby reset the charges of the wiring capacitance $C_L$. The input potential of the amplifier 11 after the resetting is made a reference potential ($\Delta V_s$ in FIG. 3(e)) for the case where no image reading signal is output from the image sensor.

As shown in FIG. 3(e), the source potential changes in the following manner. At the time instant when the gate pulse $\phi_{GT}$ is applied to the thin-film transistor $TT_{i,j}$, the source potential quickly increases by a potential variation due to what is called "feedthrough." Then, the source potential quickly decreases by the potential variation due to the feedthrough at the time instant when the gate pulse $\phi_{GT}$ falls, and temporarily settles at a certain potential, which results from the charges transferred to and stored in the wiring capacitance $C_L$. Then, as described above, the MOS transistor 12 turns conductive to reset the charges of the wiring capacitance $C_L$ and to make the source potential equal to the ground potential. Thereafter, when the MOS transistor 12 turns non-conductive, the source potential increases by the potential variation $\Delta V_s$ due to feedthrough. The resulting potential ($\Delta V_s$) is made the reference potential for the non-output state of the driver IC 3.

As shown in FIG. 3(b), after the resetting of the charges of the wiring capacitance $C_L$, the variable voltage generation circuit 5 operates to change the voltage $\phi_{VB}$, which is applied to the cathode of the photodiode 2, to a predetermined reset potential. In this embodiment, the reset potential is set at the ground potential. At the same time, as shown in FIG. 3(c), the gate pulse generation circuit 4 operates to increase the voltage $\phi_{VR}$, which is applied to the electrode of the additional capacitor Cad opposite to the electrode that is connected to the anode of the photodiode 2, from a negative voltage by a predetermined amount. The change of the voltage $\phi_{VR}$ is synchronized with the change of the voltage $\phi_{VB}$, and the increasing amount of the voltage $\phi_{VR}$ is so set in the gate pulse generation circuit 4 as to forwardly bias the photodiode 2 with a sufficient margin. In this embodiment, the voltage $\phi_{VR}$ is changed from −5 V to 0 V.

Upon simultaneous occurrences of the fall of the voltage $\phi_{VR}$ and the rise of the voltage $\phi_{VR}$ the photodiode 2 is forwardly biased and the non-transferred charges of the capacitances Cp, Cad and Cgd are removed. Thereafter, when the voltage $\phi_{VB}$ rises and the voltage $\phi_{VR}$ falls to return to their original values, the anode potential of the photodiode 2 quickly decreases by the feedthrough voltage as shown in FIG. 3(d), so that the photodiode 2 returns to the reversely biased state, i.e., the state of storing photoelectrically generated charges. Incidentally, FIGS. 3(a)–3(g) also show voltage variations in a dark state as well as those in a light state.

In the following, to clarify the effect of forwardly biasing the photodiode 2 by changing the potentials at its two ends, a description will be made of how the photodiode 2 operates when only the cathode potential is changed, with reference to FIGS. 3(f) and 3(g).

When the gate pulse $\phi_{GT}$ falls, the anode potential of the photodiode 2 quickly decreases by the feedthrough voltage, which is represented in FIG. 3(f) by $\Delta V_{FT(T)}$ and equals to Cgd·$\Delta V_G$/(Cp+Cad+Cgd) where $\Delta V_G$ is the variation of the gate pulse $\phi_{GT}$ (see FIG. 3(a)).

When only the voltage $\phi_{VB}$ being applied to the cathode is changed, i.e., falls from the predetermined positive value to the reset potential (ground potential in this embodiment) as shown in FIG. 3(b) the predetermined period after the fall of the gate pulse $\phi_{GT}$, the anode potential of the photodiode 2 further decreases by $\Delta V_{FT(p)}$, which is equal to Cp·$\Delta V_B$/(Cp+Cad +Cgd), due to feedthrough of the potential variation on the cathode side (see FIG. 3(f)).

Therefore, even where the cathode potential of the photodiode 2 varies by such an amount as in itself enables the photodiode 2 to be forwardly biased, the anode potential of the photodiode 2 is influenced by the gate pulse $\phi_{GT}$ and the variation of the voltage $\phi_{VB}$ by the feedthrough and the anode potential of the photodiode 2 remains negative. Thus, the photodiode 2 is kept reversely biased to cause an afterimage problem due to residual charges.

To avoid this problem, in the invention, the photodiode 2 is forwardly biased by raising the voltage $\phi_{VR}$ (which is applied to the electrode of the additional capacitor Cad opposite to the electrode that is connected to the anode of photodiode 2) by the predetermined amount in synchronism with the fall of the voltage $\phi_{VB}$. Due to feedthrough, a variation $\Delta V_R$ of the voltage $\phi_{VR}$ causes the anode potential of the photodiode 2 to change by Cad·$\Delta V_R$/(Cp+Cad +Cgd). Therefore, to forwardly bias the photodiode 2, it is necessary to set the variation of the voltage $\phi_{VR}$ so that the feedthrough variation $\Delta V_{FT(ad)}$ minus the feedthrough variation $\Delta V_{FT(p)}$ that is due to the variation of the voltage $\phi_{VB}$ becomes larger than the forward threshold of the photodiode 2.

In this embodiment, the photodiode 2 is temporarily rendered in a forwardly biased state by changing the voltage $\phi_{VB}$ from +5V to 0V and the voltage $\phi_{VR}$ from −5V to 0V. However, it is apparent that the values of the voltages $\phi_{VB}$ and $\phi_{VR}$ are not limited to the above ones. That is, the polarities of the voltages $\phi_{VB}$ and $\phi_{VR}$ are not essential, and it suffices that the difference between the anode and cathode potentials of the photodiode 2 is large enough to make the photodiode 2 forwardly biased.

As described above, according to this embodiment, after photoelectrically generated charges are read out from the photodiode 2, the photodiode 2 is temporarily rendered in a forwardly biased state by lowering the voltage $\phi_{VB}$ (which is applied to the cathode of the photodiode 2) to the ground potential and raising the voltage $\phi_{VR}$ (which is applied to the electrode of the additional capacitor Cad opposite to the electrode that is connected to the anode) to the ground potential, with a consideration given to the variation of the anode potential due to the feedthrough phenomena. Therefore, the photodiode 2 can be forwardly biased in a positive manner. As a result, the residual charges of the parasitic capacitance Cp, additional capacitor Cad and overlap capacitance Cgd can be removed to enable production of a correct image signal that is free from the afterimage phenomenon.

Further, according to this embodiment, in which the bias voltage of the photodiode 2 can be changed, the photodiode 2 itself and the peripheral semiconductor devices have the same constitution as those in the conventional image sensor, no change is required for the manufacturing process to enable production, in a simple manner, of image sensors free from the afterimage phenomenon.

By the way, in the ideal case of the above embodiment, a voltage signal Vp (see FIG. 4(g)) that is read in a light state by the driver IC 3 immediately before resetting the charges of the wiring capacitance $C_L$ and that is free from an offset due to a dark current etc. contributes to the image signal that is output from the driver IC 3. However, the actual image signal does not take such an ideal form, but includes an offset due to a dark current etc. That is, the actual image signal is a difference voltage V between the a reading voltage Va in a light state (i.e., a state of document reading) and a reading voltage Vb in a dark state. The reading voltage Va in a light state is a difference between the voltage Vp read by the driver IC 3 immediately before resetting the charges of the wiring capacitance $C_L$ and the voltage $\Delta V_s$ appearing at the input of the driver IC 3 after the resetting, and the reading voltage Vb in a dark state is a difference between a voltage $V_L$ (see FIG. 4(g)) read immediately before resetting the charges of the wiring capacitance $C_L$ and the voltage $\Delta V_s$ appearing at the input of the driver IC 3 after the resetting.

In this manner, in actual cases, the voltage Vb, i.e., an offset occurs in a dark state. As a result, in an image processing circuit (not shown) that amplifies the output signal of the image sensor according to the above embodiment and subject the amplified signal to various kinds of image processing, the dynamic range is reduced by an amount of the offset voltage Vb and the noise margin is reduced accordingly, to lower the image quality.

Referring to FIGS. 4(a)–4(g), we will describe a second embodiment, which is intended to suppress the offset voltage Vb. Among FIGS. 4(a)–4(g), FIGS. 4(a)–4(c) are similar to FIGS. 3(a)–3(c), and respectively show the gate pulses $\phi_{GT}$, the voltage $\phi_{VB}$ applied to the cathode, and the voltage $\phi_{VR}$ applied to the additional capacitor Cad. FIG. 4(d) shows the anode potential of the photodiode 2 in the second embodiment, and FIG. 4(e) shows the source potential of the thin-film transistor $TT_{i,j}$. FIGS. 4(f) and 4(g) are identical to FIGS. 3(d) and 3(e), and respectively show the anode potential of the photodiode 2 in the first embodiment and the source potential of the thin-film transistor in the first embodiment.

The second embodiment is basically the same as the first embodiment in the circuit configuration (see FIGS. 1 and 2), but is different from the first embodiment in the drive method as described below. The second embodiment is the same as the first embodiment in that the feedthrough voltage $\Delta V_{FT(ad)}$ caused by the variation (rise) of the voltage $\phi_{VR}$ is set larger than the feedthrough voltage $\Delta V_{FT(P)}$ caused by the variation of the voltage $\phi_{VB}$. The second embodiment is different from the first embodiment in that to remove residual charges from the photodiode 2, the voltage $\phi_{VB}$ is lowered to a positive reset potential rather than to the ground potential. With this setting, when the operation of forwarding the charges stored in the wiring capacitance $C_L$ to the driver IC 3 is started, the anode potential of the photodiode 2 (indicated by character "A" in FIG. 4(d)) is lower than in the case of the first embodiment (indicated by character "B" in FIG. 4(f)). As a result, the voltage $V_L$, which has a certain value in a dark state of the first embodiment (see FIG. 4(g)), can be reduced to zero (see FIG. 4(e)). This provides an advantage that the dynamic range of a circuit (not shown) for processing the output signal of the image sensor is increased from the conventional case.

As described above in connection with the first embodiment, the feedthrough voltage $\Delta V_{FT(ad)}$ is equal to Cad·$\Delta V_R$/(CP+Cad+Cgd) where $\Delta V_R$ is the variation of the voltage $\phi_{VR}$. Therefore, to increase $\Delta V_{FT(ad)}$, Cad or $\Delta V_R$ may be increased, or Cp or Cgd may be decreased. In a practical point of view, it is preferred that Cad or $\Delta V_R$ be increased. For example, where the additional capacitor Cad is a parallel plate capacitor, Cad can be increased by maximizing the electrode area, minimizing the electrode interval, and employing a dielectric having as large a dielectric constant as possible.

As described above, according to the second embodiment, in which the feedthrough voltage $\Delta V_{FT(ad)}$ caused by the variation of the voltage $\phi_{VR}$ is set larger than the feedthrough voltage $\Delta V_{FT(p)}$ caused by the variation of the voltage $\phi_{VB}$, the offset voltage $V_L$ can be suppressed and, as a result, the dynamic range of a circuit for amplifying the output signal of the image sensor and subjecting the amplified signal to necessary processing can be increased.

Where the feedthrough voltage $\Delta V_{FT(ad)}$ is increased by adjusting the additional capacitance Cad, there does not occur a large difference among the voltages $\phi_{GT}$, $\phi_{VB}$ and $\phi_{VR}$. Therefore, these voltages can be obtained from a common voltage supply, thus contributing to the cost reduction.

Where the feedthrough voltage $\Delta V_{FT(ad)}$ is increased by adjusting the variation of the voltage $\phi_{VR}$, it is not necessary to consider the size and shape of the additional capacitor Cad and the sizes and shapes of the thin-film transistor $TT_{i,j}$ and the photodiode 2. This will increase the degree of freedom in designing those elements.

What is claimed is:

1. An image sensor in which charges photoelectrically generated in a plurality of reversely biased photodiodes are read out to produce an image signal, said image sensor comprising:

a plurality of capacitors connected to anodes of the respective photodiodes;

main bias means for supplying to a cathode of each of the photodiodes a first voltage that is higher than a voltage of an anode of the photodiode during a period of reading a charge of the photodiode and for supplying to the cathode of each of the photodiodes a second voltage that is lower than the first voltage, during a predetermined period after the charge reading period, and for supplying the first voltage to the cathode of each of the photodiodes after a lapse of the predetermined period; and auxiliary bias means for supplying to the anodes of the photodiodes, through an associated one of the capacitors during the predetermined period, a third voltage that allows the photodiodes to be forwardly biased.

2. The image sensor of claim 1, further comprising a plurality of thin-film transistors connected to the anodes of the respective photodiodes, for sequentially transferring the charges of the photodiodes during the charge reading periods.

3. A method for driving an image sensor in which charges photoelectrically generated in a plurality of reversely biased photodiodes are read out to produce an image signal, said drive method comprising the steps of:

reading out charges from each of the photodiodes during a reading period while the photodiodes are reversely biased;

forwardly biasing the photodiodes during another period after the reading period; and reversely biasing the photodiodes after said another period, wherein the photodiodes are kept reversely biased by grounding anodes of the photodiodes through a capacitance and supplying cathodes of the photodiodes with a positive voltage that is higher than forward voltage drops of the photodiodes.

4. The drive method of claim 3, wherein a first feedthrough voltage is a function of the capacitance and the capacitance is selected to cause the first feedthrough voltage to be larger than a second feedthrough voltage caused by application of the reset voltage to the cathodes of the photodiodes.

5. The drive method of claim 4, wherein the capacitance is provided by parallel electrode plates, and the first feedthrough voltage is determined by opposing areas of the parallel electrode plates.

6. The drive method of claim 4, wherein the first feedthrough voltage is adjusted by a magnitude of the positive pulse.

* * * * *